United States Patent
Wittenbrink et al.

(10) Patent No.: US 6,846,848 B2
(45) Date of Patent: Jan. 25, 2005

(54) PRODUCTION OF HIGH PURITY FISHER-TROPSCH WAX

(75) Inventors: Robert Jay Wittenbrink, Kingwood, TX (US); Loren Leon Ansell, Baton Rouge, LA (US); Daniel Francis Ryan, Baton Rouge, LA (US); Louis Francis Burns, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/226,752

(22) Filed: Aug. 23, 2002

(65) Prior Publication Data

US 2003/0057132 A1 Mar. 27, 2003

Related U.S. Application Data

(63) Continuation-in-part of application No. 09/905,232, filed on Jul. 13, 2001, now abandoned.

(51) Int. Cl.[7] .............................................. C07C 27/00
(52) U.S. Cl. ....................... 518/700; 818/709; 818/715
(58) Field of Search ................................. 518/700, 709, 518/715

(56) References Cited

U.S. PATENT DOCUMENTS

| | | | |
|---|---|---|---|
| 4,943,672 A | * | 7/1990 | Hamner et al. ............. 585/737 |
| 5,260,239 A | | 11/1993 | Hsia |
| 5,288,673 A | | 2/1994 | Behrmann et al. ............. 502/30 |
| 5,382,748 A | | 1/1995 | Behrmann et al. ........... 585/899 |
| 5,811,469 A | | 9/1998 | Leviness et al. ............. 518/700 |
| 5,827,903 A | | 10/1998 | White et al. ................. 518/710 |
| 5,958,986 A | | 9/1999 | Mart et al. .................... 518/709 |
| 6,068,760 A | | 5/2000 | Benham et al. ............. 208/950 |
| 6,590,002 B2 | * | 7/2003 | Wittenbrink et al. ........ 518/715 |

FOREIGN PATENT DOCUMENTS

| | | | |
|---|---|---|---|
| EP | 0967262 A1 | 12/1999 | ............ C10G/69/02 |
| WO | WO 9850485 | 11/1998 | ............ C10G/2/00 |
| WO | WO 9850489 | 11/1998 | ............ C10G/2/00 |
| WO | WO 9850490 | 11/1998 | ............ C10G/2/00 |
| WO | WO 9937736 | 7/1999 | ............ C10G/45/02 |
| WO | WO 9941217 | 8/1999 | ............ C07C/1/04 |
| WO | WO 02076600 | 10/2002 | ............ C10G/2/00 |

* cited by examiner

Primary Examiner—J. Parsa
(74) Attorney, Agent, or Firm—Mark D. Marin

(57) ABSTRACT

A hydrocarbon wax product from a hydrocarbon synthesis slurry comprising liquid synthesis product and catalyst particles is purified by introducing a portion of hydrocarbon synthesis slurry from a hydrocarbon synthesis zone to a treatment zone in which a treatment gas contacts the hydrocarbon synthesis slurry. Hydrogen or a hydrogen-containing gas is useful as the treatment gas. The gas treatment removes impurities from the hydrocarbon wax portion of the hydrocarbon synthesis slurry. Purified wax product is separated and removed in situ via wax withdrawal means. This avoids or minimizes the need for further treating the wax product.

10 Claims, 1 Drawing Sheet

PRODUCTION OF HIGH PURITY FISHER-TROPSCH WAX

This application is a Continuation-In-Part of U.S. Ser. No. 09/905,232 filed Jul. 13, 2001, now abandoned.

FIELD OF THE INVENTION

The present invention relates to a slurry type hydrocarbon synthesis process in which impurities are removed in situ from a hydrocarbon slurry liquid comprising the raw wax product of the hydrocarbon synthesis reaction.

BACKGROUND OF THE INVENTION

Hydrocarbon synthesis (HCS) methods utilizing Fischer-Tropsch processes are well known and described in the art. In a Fischer-Tropsch process, synthesis gas ($CO+H_2$) made, e.g. from natural gas, is converted over a catalyst, e.g. a ruthenium, iron, or cobalt catalyst, to form a wide range of products including gaseous and liquid hydrocarbons, oxygenates and a normally solid, high paraffin hydrocarbon wax. Typically, Fischer-Tropsch waxes are upgraded by catalytically converting them to lower boiling paraffinic hydrocarbons falling within the gasoline and middle distillate boiling ranges. This treatment primarily involves hydrogenation, e.g. hydroisomerization, hydrocracking, hydrorefining and the more severe hydrorefining referred to as hydrotreating. However, as new markets expand, the demand for high quality waxes as end products has increased. The varied and growing uses for high quality Fischer-Tropsch waxes include e.g. food containers, waxed paper, coating materials, electrical insulators, candles, crayons, markers, cosmetics, etc. Stringent purity requirements that a wax must meet are set by regulatory authorities such as the FDA in the United States and the SCF in the European Union, particularly if the wax is to be used in food and drug applications.

Fischer-Tropsch waxes have many desirable properties. They have high paraffin contents and are essentially free of the sulfur, nitrogen and aromatic impurities found in petroleum waxes. However, untreated raw Fischer-Tropsch waxes may contain small but significant quantities of olefins and oxygenates (e.g. long chain primary alcohols, acids and esters) formed in the slurry as by products of the HCS reaction. Consequently, there is a need to further treat raw Fischer-Tropsch wax to remove these impurities. This additional treatment is part of a time consuming and costly process as Fischer-Tropsch waxes typically undergo hydroprocessing in order to achieve high purity. These purification measures typically occur in another reactor separate from the reactor where the hydrocarbon synthesis has occurred. In addition, different catalysts are used to hydroprocess the wax. Accordingly, there is a need for a more efficient and direct method of producing purified Fischer-Tropsch wax from a hydrocarbon synthesis process.

A preferred process mode for operating the Fischer-Tropsch process is a slurry-type process which may be carried out, e.g. in moving bed systems or slurry reactors. The slurry comprises slurry liquid and finally divided catalyst, wherein the catalyst particles are suspended in a liquid hydrocarbon and the CO/hydrogen mixture is forced through the catalyst/hydrocarbon slurry allowing good contact between the CO/hydrogen and the catalyst to initiate and maintain the hydrocarbon synthesis process.

Advantages of a slurry-type process, over that of a fixed bed process are that there is better control of the exothermic heat produced in the Fischer-Tropsch process during the reaction and better control over catalyst activity maintenance by allowing recycle, recovery, and rejuvenation procedures to be implemented. The slurry process can be operated in a batch or in a continuous cycle, and in the continuous cycle, the entire slurry can be circulated in the system allowing for better control of the primary products' residence time in the reaction zone.

Slurry reactors, sometimes referred to as "bubble columns," are well known for carrying out highly exothermic, three phase slurry-type Fischer-Tropsch reactions. As disclosed in U.S. Pat. No. 5,348,982, in a three-phase hydrocarbon synthesis (HCS) process, a synthesis gas comprising a mixture of $H_2$ and CO (syngas) is bubbled up as a third, gaseous phase through the slurry in the reactor. The slurry comprises liquid hydrocarbons and dispersed solid particles comprising a suitable Fischer-Tropsch type hydrocarbon synthesis catalyst. The catalyst particles are typically kept dispersed and suspended in the liquid by the lifting action of the syngas bubbling up through the slurry and by hydraulic means. Typically, the slurry liquid is the product of the reaction, usually $C_5$–$C_{100}$ hydrocarbons. Preferably, the slurry liquid comprises primarily high boiling paraffins (Fischer-Tropsch waxes).

SUMMARY OF THE INVENTION

The present invention relates to a method for treating and separating purified Fischer-Tropsch wax in situ from the catalyst/hydrocarbon mixture produced in a hydrocarbon synthesis process. The catalyst/hydrocarbon mixture, referred to herein as the "slurry" comprises catalyst particles and slurry liquid. The slurry liquid comprises the products of the hydrocarbon synthesis reaction, primarily Fischer-Tropsch waxes. In one embodiment, a portion of slurry produced in a hydrocarbon synthesis process is passed from a hydrocarbon synthesis reaction zone into a treatment zone where it is contacted with treatment gas, preferably hydrogen or hydrogen-containing gas. Contact with the treatment gas removes impurities such as oxygenates or olefins from the slurry liquid, e.g., by converting them to hydrocarbons. The treatment gas injected into the treatment zone preferably comprises hydrogen and may contain other gases such as nitrogen, $CO_2$, $H_2O$, $CH_4$, $C_2$–$C_4$ hydrocarbons, and also CO (as long as the mole ratio of the $H_2$ to CO is sufficient to remove the CO and still remove at least a portion of the impurities from the wax). In another embodiment, all or a portion of the treatment gas may be recycled back into the treatment zone after it has been treated to remove oxygenates and other impurities such as nitrogen so as not to re-contaminate the treated wax. Optionally, the treatment gas acts as a lift gas and may aid in removing de-activating species which degrade catalyst activity in the slurry. The gas treated slurry is passed through a wax withdrawal means, such as a filter, where a portion of purified, slurry, liquid wax product is drawn off and recovered. The recovered wax product is passed to storage, sold as end product, further upgraded if necessary, etc. In a preferred embodiment, off-gases produced during the gas treatment are removed from the treated slurry prior to passing it to wax withdrawal means. Reducing the gas content of the circulating treated slurry results in greater liquid throughput through the wax withdrawal means and prevents off-gas from re-contaminating the hydrocarbon synthesis reaction in the synthesis one.

With specific regard to a slurry-type hydrocarbon synthesis process form forming Fischer-Tropsch waxes, at least a portion of which are liquid at the reaction conditions, the invention comprises the steps of:

(a) reacting a synthesis gas comprising a mixture of $H_2$ and CO in the presence of a solid, particulate hydrocarbon synthesis catalyst in a slurry comprising said catalyst and a hydrocarbon liquid in a Fischer-Tropsch reactor synthesis zone under reaction conditions effective to form a liquid hydrocarbon wax, said hydrocarbon liquid comprising said liquid hydrocarbon wax;

(b) passing a portion of said slurry from said synthesis zone to a treatment zone;

(c) contacting said slurry in said treatment zone with a treatment gas to form a treated slurry, said treated slurry comprising said catalyst particles and a purified hydrocarbon liquid product comprising a purified hydrocarbon wax;

(d) passing said treated slurry through wax withdrawal means to separate and withdraw a portion of said purified hydrocarbon wax from said treated slurry; and, (e) passing the remainder of the treated slurry back into the synthesis zone.

Treatment gas is preferably hydrogen or hydrogen-containing gas. In one embodiment, the treated slurry is passed through gas disengagement means in which off-gas produced in step c) is removed from the treated slurry before the purified hydrocarbon wax is separated and withdrawn.

In the context of the invention, the term "slurry" refers to a mixture of solid catalyst particles and hydrocarbon liquid in a slurry-type hydrocarbon synthesis process. The catalyst is any suitable Fischer-Tropsch catalyst and the hydrocarbon liquid comprises the hydrocarbon product of the hydrocarbon synthesis process, primarily high boiling liquid paraffin wax. The term "impurities" refers to oxygenates, (i.e. primary and secondary alcohols, acids, esters or mixtures thereof), olefins and the like in the hydrocarbon liquid which are removed by contact with a treatment gas, e.g. by contacting them with hydrogen or hydrogen-containing gas and converting them to hydrocarbons. As used herein, "catalyst deactivating species" is meant to include species that degrade catalyst activity. Such deactivating species are removed by contact with the same treatment gas that serves to remove impurities from the liquid hydrocarbon wax product of the Fischer-Tropsch reaction.

DETAILED DESCRIPTION OF THE INVENTION

Figures 1, 2:
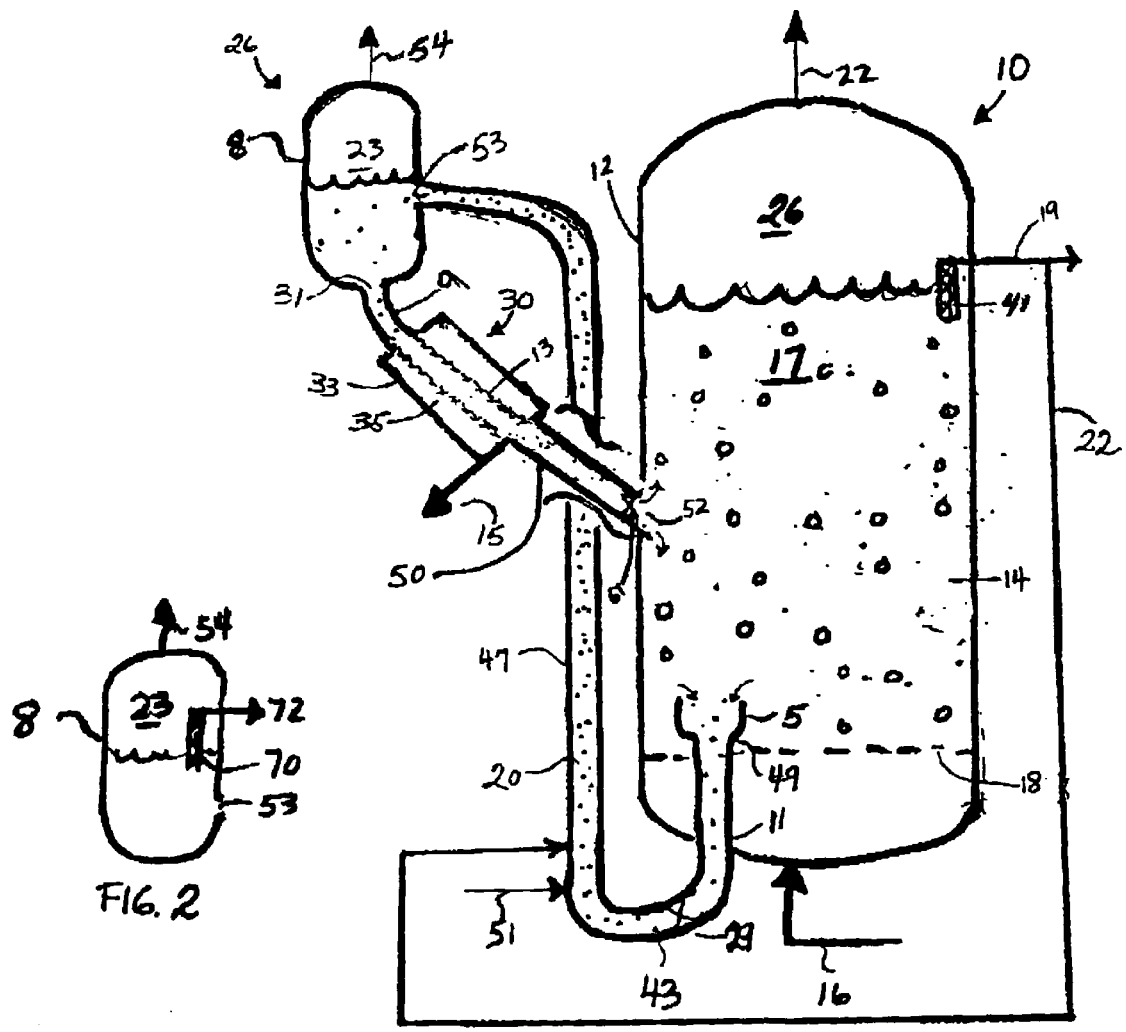
FIG. 1 shows a schematic representation of a process in accordance with the present invention.
FIG. 2 shows a schematic representation of an alternative embodiment of the process in accordance with the present invention.

According to the present invention, a hydrocarbon wax product from a hydrocarbon synthesis slurry comprising liquid synthesis product and catalyst particles is purified by circulating the slurry from a hydrocarbon synthesis zone in a Fischer-Tropsch reactor through a treatment zone in which a treatment gas contacts the slurry. Hydrogen or a hydrogen-containing gas is useful as the treatment gas. Other gases may be present, including light hydrocarbons, e.g. $CH_4$, $C_2H_6$, or nitrogen; however, care should be taken to avoid known Fischer-Tropsch catalyst poisons, e.g. $H_2S$. The gas treatment removes impurities from the liquid hydrocarbon wax product and also removes catalyst de-activating species which may be present in the slurry. Purified wax product is separated from the treated slurry and removed from the process via wax withdrawal means. This avoids or minimizes the need for further treatment of the wax product. The remaining treated slurry may be passed back into the hydrocarbon synthesis zone.

The hydrocarbon synthesis reactor will typically be operating during treatment and filtration and may be continuous or intermittent. The wax treatment process does not interrupt the hydrocarbon synthesis reaction taking place in the hydrocarbon synthesis zone of the Fisher-Tropsch reactor. While the treatment zone is separate from the synthesis zone, it may optionally be located within the synthesis zone. In preferred embodiments, however, the treatment zone is housed in a separate unit outside of the reactor and is connected to the reactor by conduits within which a portion of slurry from the synthesis zone circulates. By using separate units to house the synthesis zone and the treatment zone, it is not necessary that slurry treatment by conducted at the same reaction conditions as the Fisher-Tropsch reaction within the synthesis zone. Conditions such as temperature may be independently regulated as disclosed in co-pending U.S. Ser. No. 905,231.

When separate reaction units are used, it is preferred that the units housing the treatment zone have isolation means, such as valves in the connecting conduits which enable it to be isolated from the reactor. This isolation feature permits separate repair and maintenance. Likewise, it is preferable for the wax withdrawal means to be housed separately from the synthesis reaction zone, thus allowing separate maintenance, e.g. filter removal and replacement without having to take the HCS reactor off-line. This allows operation on a continuous basis with each process being performed at optimal, uninterrupted conditions. In U.S. Pat. No. 5,260,239, Hsia discloses a process for removing a portion of slurry comprising degraded catalyst in liquid synthesis product from the hydrocarbon synthesis zone of a Fischer-Tropsch reactor, removing catalyst de-activating species in an external rejuvenation vessel and then returning the slurry containing rejuvenated catalyst to the main slurry body in the Fischer-Tropsch reactor. However, rejuvenation and recycling of Fischer-Tropsch catalyst does not address the treatment of the slurry liquid comprising Fischer-Tropsch wax product for removal of impurities. Additionally, the recycling method disclosed by Hsia does not provide for removal of a portion of treated Fischer-Tropsch wax product prior to recycling the rejuvenated catalyst back into the hydrocarbon synthesis zone.

One embodiment of the invention is illustrated in schematic cross section in FIG. 1 wherein synthesis gas is introduced into a slurry-type Fischer-Tropsch reactor 10 and maintained at reaction temperature and pressure. Pressures typically range from 5–30 bar, more preferably 10–25 bar. Temperatures may range from about 193–232° C., preferably 199–230° C. Molar hydrogen to carbon monoxide ratios in the feed gas may range from about 1.5:1–2.5:1, preferably about 1.9:1–2.2:1.

Slurry reactor 10 comprises a hollow shell 12 housing a hydrocarbon synthesis reaction zone 17 with hydrocarbon synthesis slurry 14 within. The slurry 14 comprises solid catalyst particles and hydrocarbon liquid. The slurry liquid comprises HCS reaction products which are liquid at the slurry reaction conditions, preferably Fischer-Tropsch waxes with small amounts of primary and secondary alcohols, acids, esters, olefins or mixtures thereof. Gas reaction products of the hydrocarbon synthesis reaction escape slurry 14 and collect in gas collection space 26. Gas inlet line 16 feeds a syngas into the reactor and up into the bottom of the slurry through suitable gas distribution means 18 at the bottom of the slurry. Gas distribution means injects the gas up into the bottom of slurry in which it rises as gas bubbles indicated by the small circles. Unreacted synthesis gas escapes the slurry and also collects in gas collection space 26 in the top of the reactor and is removed via gas product line 22.

Hydrocarbon liquid withdrawal means 41, such as a filter, is located within the synthesis zone 17 for withdrawing hydrocarbon product (i.e. raw Fischer-Tropsch wax) from the reactor 10 via line 29. Conduit 11 exits the reactor and extends over laterally as transverse portion 43, which turns upward into hollow lift pipe 47 and is in fluid communication with interior treatment zone 20 of lift pipe. Shut-off valve 29 in transverse portion 43 of conduit 11 allows the treatment zone to be isolated from reactor 10 if desired.

Thus, liquid Fischer-Tropsch wax in the presence of catalyst particles disengages from the gaseous product in the reactor 10 and falls under its own weight as a slurry into collecting cup 5 and enter conduit via orifice 49 which is in fluid communication with conduit 11. After exiting the reactor the slurry then passes over and into the interior treatment zone 20 of lift pipe 47. Treatment gas comprising hydrogen is passed via line 51 into the interior of lift pipe 47 near the bottom thereof, in which it contacts the circulating slurry to remove impurities such as olefins and oxygenates (i.e. primary and secondary alcohols, acids, esters or mixtures thereof) from the liquid wax phase. Optionally, hydrocarbon synthesis product from line 19 (i.e. untreated Fischer-Tropsch wax) may be recycled via line 22 such that it enters the interior of lift pipe 47 for treatment. Treatment gas may also removes catalyst deactivating species and may act as a lift gas to lift the treated slurry up over and out of the upper opening 53 and into optional gas disengaging means 26 comprising vessel 8. In gas separating means the off-gas produced during treatment escapes from the treated slurry into collection zone 23 and is removed via gas line 54. This offgas is consumed as fuel or sent to further processing.

Disengaged from the offgas, liquid wax and catalyst particles fall into the bottom portion of vessel 8 as a gas-reduced treated slurry which is in fluid communication with tubular conduit 9 via orifice 31. The gas-reduced treated slurry flows down through tubular conduit 9 into wax withdrawal means 30. In this embodiment, wax withdrawal means 30 comprises a portion of conduit 9 which is surrounded and enclosed by a larger diameter outer conduit 33 defining annular space 35 therebetween. In that portion adjacent to annular space 35, conduit 9 has a semi-permeable wall 13 through which liquid wax but not catalyst particles may pass. Semi-permeable wall 13 is comprised of e.g. fine meshed screen, helically wound threads or, preferably, sintered metal particles. Treated slurry flows through orifice 31 into the interior of conduit 9 where a portion of the purified liquid wax phase passes out of the interior through semi-permeable wall 13 into annular space 35 as product. Thus, purified wax product is separated from the treated slurry as it passes through the interior of conduit 9. Purified wax product is removed from the process via line 15 which, in this embodiment, is in fluid connection with annular space 35. Treated slurry remaining in the interior of semi-permeable wall 13 passes back into hydrocarbon synthesis reaction zone 17 of reactor 10 via conduit 50 and orifice 52. Shutoff valve 67 allows reactor 10 to be isolated from the external units, if necessary, e.g. for separate maintenance and repair.

Any suitable means for separating wax product from a mixture of liquid wax and catalyst particles is useful for withdrawal of the purified wax product of the present invention. For example, FIG. 2 shows an alternate embodiment wherein purified wax product may be separated via withdrawal means 70, such as a filter, located within gas disengaging vessel 8 and removed via line 72. Like parts are like numbered to those in FIG. 1.

The removal of impurities from circulating hydrocarbon liquid in the present invention process is demonstrable by measuring differences in the levels of selected impurities in Fischer-Tropsch wax drawn from a HCS reactor with external treatment means when such means are in an operating mode and in a non-operating mode. Infrared spectroscopy can be used for determining olefin and selected oxygenate concentrations in the wax product. In the examples that follow, esters were selected for measurement since they are typically the most difficult molecules to hydrogenate relative to the other species (e.g., acids or olefins) in Fischer-Tropsch wax. The ester content is determined using infrared spectroscopy by rationing an ester peak to a hydrocarbon overtone band and subsequently multiplying the ratio by a factor derived from infrared spectra of samples with known ester concentrations. Using infrared spectroscopy, the average ester content of wax taken from the synthesis zone of a Fischer-Tropsch reactor with external continuous hydrogen treatment capability was determined with and without external continuous hydrogen treatment in operation.

EXAMPLE NO. 1
Synthesis of the Fischer-Tropsch Wax External Continuous Hydrogen Treatment.

A mixture of hydrogen and carbon monoxide synthesis gas ($H_2:CO=2.1:1$) was converted to heavy paraffins in the slurry bubble column reactor vessel of a multi vessel HCS unit with treatment means to remove catalyst de-activating species from circulating slurry similar that that disclosed by Hsia in U.S. Pat. No. 5,260,239. The catalyst utilized was a titania supported cobalt rhenium catalyst similar to that described in U.S. Pat. No. 4,568,663. The reaction was conducted at 210° C. and 18 bar. The feed was introduced at a linear velocity of 16.7 cm/sec. The CO conversion was 50 percent. Hydrogen was introduced at about 40 standard liters (15° C., 1 atm) per minute. The system provided a slurry conduit valve which was in a closed position, thus placing the reactor's external hydrogen treatment capabilities in a non-operative mode. Fischer-Tropsch wax from the reactor was withdrawn and analyzed. The average ester content, which reflects the oxygenate content of the wax, is shown in Table 1 below. Average ester content is based on elemental oxygen.

Under conditions similar to those in Example 1, the slurry conduit valve was placed in an open position thus enabling the continuous external hydrogen treatment capabilities of the reactor. Hydrogen gas was introduced into the treatment zone at about 90 standard liters (15° C., 1 atm) per minute and the resulting average ester content of the Fischer-Tropsch wax withdrawn from the reactor was determined. The results are listed in Table 1.

TABLE 1

| Example | External Continuous Hydrogen Treatment Means | Average Ester Content |
|---------|----------------------------------------------|------------------------|
| No. 1   | Off                                          | 3.5 μmoles/gram-wax    |
| No. 2   | On                                           | 0.50 μmoles/gram-wax   |

From the results recorded in Table 1, it is observed that the ester content of the wax decreased when the external continuous hydrogen treatment means was operating, thus demonstrating direct purification of the circulating slurry containing Fischer-Tropsch wax which was then drawn directly from the reactor.

In a slurry HCS process the mole ratio of the $H_2$ to CO is typically about 1.7 to 2.3. The slurry liquid in the reactor comprises the hydrocarbon products produced by the hydrocarbon synthesis reaction which are liquid at the reaction conditions. The temperature and pressure in the slurry can vary widely depending on the particular catalyst used and products desired. Typically, for the production of preferred hydrocarbons comprising predominantly Fischer-Tropsch waxes (preferably $C_{10}$+paraffins), a supported cobalt catalyst is employed. The slurry typically contains from about 10 wt. % to 70 wt. % catalyst solids, more typically from 30 wt. % to 60 wt. % and in some embodiments 40 wt. % to 55 wt. % is preferred. While catalyst particle sizes may broadly range from as small as 1 to as large as 200 microns, a typical conventional Fe or supported iron catalyst will have a mean particle size of about 20–25 microns, while a catalyst comprising a catalytic metal such as cobalt composited with or supported on titania will typically have a mean particle size of about 50–70 microns.

In Fischer-Tropsch hydrocarbon synthesis methods useful with present invention process, the synthesis reaction is carried out under shifting or non-shifting conditions and preferably under non-shifting conditions in which little or no water gas shift reaction occurs, particularly when the catalytic metal comprises Co, Ru or mixture thereof. Suitable Fischer-Tropsch catalyst comprises, for example, one or more Group VIII catalytic metals such as Fe, Ni, Co, Ru and Re. In one embodiment the catalyst comprises catalytically effective amounts of Co and one or more of Re, Ru, Fe, Ni, Th, Zr, Hf, U, Mg and La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products, such as Fischer Tropsch waxes are desired. Useful catalysts and their preparation are known and illustrative, but nonlimiting examples may be found, for example, in U.S. Pat. Nos. 4,568,663; 4,663,305; 4,542,122; 4,621,072 and 5,545,674.

What is claimed is:

1. A process for forming a hydrocarbon wax product comprising (a) reacting a synthesis gas comprising a mixture of $H_2$ and CO in the presence of a solid, particulate hydrocarbon synthesis catalyst in a hydrocarbon synthesis shiny comprising said catalyst and a hydrocarbon liquid in a hydrocarbon synthesis zone of a reactor under reaction conditions effective to form a liquid hydrocarbon wax, said hydrocarbon liquid comprising said liquid hydrocarbon wax;

(b) introducing a portion of said hydrocarbon synthesis shiny containing the liquid hydrocarbon wax into a treatment zone;

(c) contacting said portion of said hydrocarbon synthesis shiny in said treatment zone with a hydrogen-containing treatment gas to form a treated slurry, said treated shiny comprising said catalyst particles and a treated hydrocarbon liquid, comprising a purified hydrocarbon wax; and, (d) separating the hydrocarbon wax from said treated slurry.

2. The process of claim 1 further including the step of re-introducing said treated slurry into said hydrocarbon synthesis zone.

3. The process of claim 2, wherein said treatment gas comprises hydrogen.

4. The process of claim 1, further including the step of introducing said treated slurry to gas disengaging means prior to separating said treated slurry from the treated wax.

5. The process according to claim 3 wherein said treatment zone and said separating are external to said reactor.

6. The process of claim 5 wherein said separating means comprises a tubular filter member surrounded by a larger diameter outer member forming an annular space therebetween, wherein said filter member has a semi-permeable wall that is permeable to said purified hydrocarbon wax and impermeable to said catalyst.

7. The process of claim 6 wherein said semi-permeable wall comprises sintered metal.

8. The process of claim 5 wherein said catalyst comprises a supported Group VIII metal.

9. The process of claim 8 wherein said metal comprises cobalt.

10. The process of claim 9 wherein said support includes titania, alumina, or silica-alumina.

* * * * *

UNITED STATES PATENT AND TRADEMARK OFFICE
CERTIFICATE OF CORRECTION

PATENT NO.    : 6,846,848 B2
DATED         : January 25, 2005
INVENTOR(S)   : Robert J. Wittenbrink et al.

It is certified that error appears in the above-identified patent and that said Letters Patent is hereby corrected as shown below:

Column 7,
Line 44, claim 1 should read:

A process for forming a hydrocarbon wax product comprising (a) reacting a synthesis gas comprising a mixture of $H_2$ and CO in the presence of a solid, particulate hydrocarbon synthesis catalyst in a hydrocarbon synthesis slurry comprising said catalyst and a hydrocarbon liquid in a hydrocarbon synthesis zone of a reactor under reaction conditions effective to form a liquid hydrocarbon wax, said hydrocarbon liquid comprising said liquid hydrocarbon wax;

(b) intoducing a portion of said hydrocarbon synthesis slurry containing the liquid hydrocarbon wax into a treatment zone;

(c) contacting said portion of said hydrocarbon synthesis slurry in said treatment zone with a hydrogen-containing treatment gas to form a treated slurry, said treated slurry comprising said catalyst particles and a treated hydrocarbon liquid, comprising a purified hydrocarbon wax; and, (d) separating the hydrocarbon wax from said treated slurry.

Signed and Sealed this

Twenty-fourth Day of January, 2006

JON W. DUDAS
*Director of the United States Patent and Trademark Office*